United States Patent
Kent et al.

(10) Patent No.: US 11,433,491 B1
(45) Date of Patent: Sep. 6, 2022

(54) RESURFACING DISCHARGE RING OF HYDRAULIC TURBINE WITH RUNNER IN PLACE

(71) Applicant: ANDRITZ HYDRO CORP., Charlotte, NC (US)

(72) Inventors: Samuel Riley Kent, Davidson, NC (US); Mauricio Recalcatti, Charlotte, NC (US); Nathan Steele, Concord, NC (US); Joseph Matthew Travis, Huntersville, NC (US); Bernard Cantin, Charlotte, NC (US); William Hopper, Lewiston, ID (US); Kenneth R. Sykes, Newport, WA (US); Lorenzo Pelayo, Payette, ID (US); Christopher Hayes, Lenore, ID (US); Hiram Lee Avant, Wilmington, NC (US)

(73) Assignee: ANDRITZ HYDRO CORP., Charlotte, NC (US)

( * ) Notice: Subject to any disclaimer, the term of this patent is extended or adjusted under 35 U.S.C. 154(b) by 0 days.

(21) Appl. No.: 17/375,409

(22) Filed: Jul. 14, 2021

(51) Int. Cl.
*B23P 6/00* (2006.01)
*B23Q 9/00* (2006.01)
(Continued)

(52) U.S. Cl.
CPC ............ *B23P 6/005* (2013.01); *B23P 6/007* (2013.01); *B23Q 9/0021* (2013.01); *F03B 3/18* (2013.01);
(Continued)

(58) Field of Classification Search
CPC ............ B23P 6/002–007; F01D 25/285; F05B 2230/10; F05B 2230/30–31; F05B 2230/80; B23Q 9/0021; F03B 3/02; F03B 3/04; F03B 3/125; F03B 3/126; F05D 2230/10; F05D 2230/30–31; F05D 2230/72; F05D 2230/80
See application file for complete search history.

(56) References Cited

U.S. PATENT DOCUMENTS 3,793,698 A * 2/1974 Goings ............... B23Q 9/0021
                                                      29/889.1
4,884,326 A * 12/1989 Porter .................... B23P 6/002
                                                      29/889.1

(Continued)

FOREIGN PATENT DOCUMENTS

EP          0304408 A2 *  2/1989  .......... B23Q 9/0021

*Primary Examiner* — Matthew P Travers
(74) *Attorney, Agent, or Firm* — Kilpatrick Townsend & Stockton LLP (57) ABSTRACT

A method for repairing a discharge ring of a hydraulic turbine with a turbine runner in place includes: mounting adjustable fixtures to runner blades that are approximately evenly spaced around the turbine runner, where each adjustable fixture is mounted to a different runner blade at a different predetermined vertical position with respect to a surface of the discharge ring; attaching cutting equipment configured to remove material from the discharge ring to each adjustable fixture installed on the runner blades; installing a drive unit configured to rotate the turbine runner; controlling the drive unit to rotate the runner at a specified speed; and controlling the cutting equipment attached to each adjustable fixture to concurrently remove material from the discharge ring as the turbine runner rotates.

12 Claims, 10 Drawing Sheets

(51) Int. Cl.
  *F01D 25/28* (2006.01)
  *F03B 3/18* (2006.01)
(52) U.S. Cl.
  CPC ........ *F01D 25/285* (2013.01); *F05B 2220/32* (2013.01); *F05B 2230/10* (2013.01); *F05B 2230/80* (2013.01); *F05D 2230/30* (2013.01); *F05D 2230/80* (2013.01)

(56) References Cited

U.S. PATENT DOCUMENTS

| | | | |
|---|---|---|---|
| 5,148,635 A * | 9/1992 | Porter | B23P 6/002 451/296 |
| 2019/0360338 A1* | 11/2019 | Diwinsky | G01B 21/16 |

* cited by examiner

RESURFACING DISCHARGE RING OF HYDRAULIC TURBINE WITH RUNNER IN PLACE

BACKGROUND

Unless otherwise indicated herein, the materials described in this section are not prior art to the claims in this application and are not admitted to be prior art by inclusion in this section.

A hydraulic turbine is a mechanical device that converts the potential energy contained in an elevated body of water (a river or reservoir) into rotational mechanical energy. Reaction turbines, for example, Kaplan turbines or Francis turbines, operate with their runners fully flooded and develop torque because of the reaction of water pressure against runner blades. The principal components of a turbine include a runner, a water supply case to convey the water to the runner, wicket gates to control the quantity of water and distribute it equally to the runner, and a discharge tube to convey the water away from the turbine. In a Francis turbine, for example, water enters the turbine in a radial direction with respect to the shaft, and is discharged in an axial direction.

Cavitation is a problem for reaction turbines caused by static water pressure in the turbine falling below the vapor pressure of water. Cavitation causes erosion and pitting of the metallic surfaces of the turbine, such as the runner blades and discharge ring, and reduces the efficiency of the turbine. In order to restore turbine efficiency, the metallic components must be replaced or the surfaces repaired by resurfacing.

To resurface a discharge ring, the turbine runner is typically disassembled and removed to provide access to the discharge ring. Heavy machinery such as a heavy lifting crane is required to perform the disassembly and removal. Additional heavy machinery is then required to perform the resurfacing. Set up and removal of the machinery as well as the disassembly and reassembly of the turbine runner involves considerable time and expense for the utility provider.

SUMMARY

Systems and methods for resurfacing a hydraulic turbine discharge tube without removing the turbine runner are provided.

According to various aspects there is provided a method for repairing a discharge ring of a hydraulic turbine with a turbine runner in place. In some aspects, the method may include: mounting adjustable fixtures to different runner blades that are approximately evenly spaced around the turbine runner, wherein each adjustable fixture is mounted to a runner blade at a different predetermined vertical position with respect to a surface of the discharge ring; attaching cutting equipment configured to remove material from the discharge ring to each adjustable fixture installed on the runner blades; installing a drive unit configured to rotate the turbine runner; controlling the drive unit to rotate the runner at a specified speed; and controlling the cutting equipment attached to each adjustable fixture to concurrently remove material from the discharge ring as the turbine runner rotates.

According to various aspects there is provided a system. In some aspects, the system may include: adjustable fixtures configured to accommodate adjustable tool holders, the adjustable tool holders being configured to attach tools for performing resurfacing operations on a discharge ring of a hydraulic turbine; one or more drive units configured to cause a runner of the hydraulic turbine to rotate; and a control panel configured to control power to the tools for performing resurfacing operations and provide control signals to the one or more drive units. The adjustable fixtures are mounted to runner blades of the runner while the runner is in place on the hydraulic turbine. The control panel is further configured to receive operator input to cause the one or more drive units to rotate the turbine runner, and the tools attached to the adjustable tool holders are configured to perform the resurfacing operations on a discharge ring as the turbine runner rotates.

According to various aspects there is provided a method for resurfacing a discharge ring of a hydraulic turbine. In some aspects, the method may include: mounting adjustable fixtures to runner blades of a runner of the hydraulic turbine while the runner is in place on the hydraulic turbine, the adjustable fixtures being configured to accommodate adjustable tool holders, the adjustable tool holders being configured to attach tools for performing resurfacing operations on a discharge ring of a hydraulic turbine, wherein each adjustable fixture is mounted to a different runner blade at a different predetermined vertical position with respect to a surface of the discharge ring; installing to a portion of a turbine frame one or more drive units configured to cause a runner of the hydraulic turbine to rotate, the one or more drive units being configured to provide a rotational force to a brake ring attached to a turbine shaft of the hydraulic turbine; and controlling the cutting equipment attached to each adjustable fixture to concurrently remove material from the discharge ring as the turbine runner rotates a specified speed.

BRIEF DESCRIPTION OF THE DRAWINGS

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Similar reference characters indicate corresponding parts throughout the several views unless otherwise stated. Although the drawings represent embodiments of various features and components according to the present disclosure, the drawings are not necessarily to scale and certain features may be exaggerated in order to better illustrate embodiments of the present disclosure, and such exemplifications are not to be construed as limiting the scope of the present disclosure.

Except as otherwise expressly stated herein, the following rules of interpretation apply to this specification: (a) all words used herein shall be construed to be of such gender or number (singular or plural) as to circumstances require; (b) the singular terms "a," "an," and "the," as used in the specification and the appended claims include plural references unless the context clearly dictates otherwise; (c) the antecedent term "about" applied to a recited range or value denotes an approximation within the deviation in the range or values known or expected in the art from the measurements; (d) the words "herein," "hereby," "hereto," "hereinbefore," and "hereinafter," and words of similar import, refer to this specification in its entirety and not to any particular paragraph, claim, or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms, "comprising," "having," "including," and "containing" are to be construed as open-ended terms (i.e., meaning "including but not limited to").

Recitation of ranges of values herein are merely intended to serve as a shorthand method of referring individually to each separate value falling within the range of within any sub ranges there between, unless otherwise clearly indicated herein. Each separate value within a recited range is incorporated into the specification or claims as if each separate value were individually recited herein. Where a specific range of values is provided, it is understood that each intervening value, to the tenth or less of the unit of the lower limit between the upper and lower limit of that range and any other stated or intervening value in that stated range or sub range hereof, is included herein unless the context clearly dictates otherwise. All subranges are also included. The upper and lower limits of these smaller ranges are also included therein, subject to any specifically and expressly excluded limit in the stated range.

Figure 1:
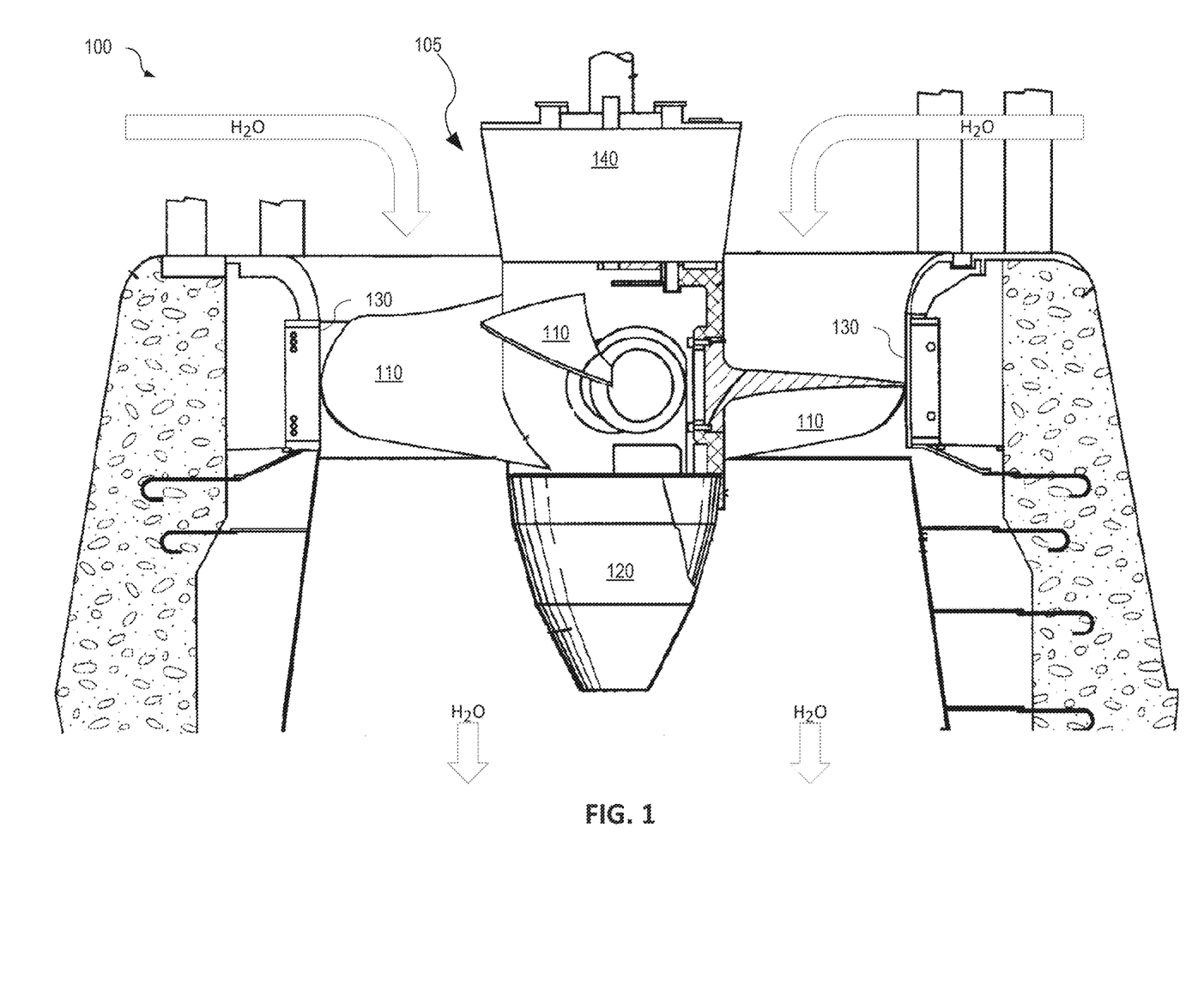
FIG. 1 is diagram illustrating a conventional hydraulic turbine.

A hydraulic turbine is a mechanical device that converts the potential energy of an elevated body of water into rotational mechanical energy. Pressure from water flowing past blades of the turbine produces the rotational mechanical energy. FIG. 1 illustrates a conventional hydraulic turbine 100. The hydraulic turbine 100 may include a runner 105 having runner blades 110 coupled to a conical hub 120. Water flows axially parallel to the turbine shaft 140 through the hydraulic turbine 100 and is discharged axially downward. A chamber formed by a discharge ring 130 extends cylindrically around the tips of runner blades 110. The turbine shaft 140 connects to the conical hub 120 and to an electrical generator (not shown) at an upper end of the turbine shaft 140.

Figure 2:
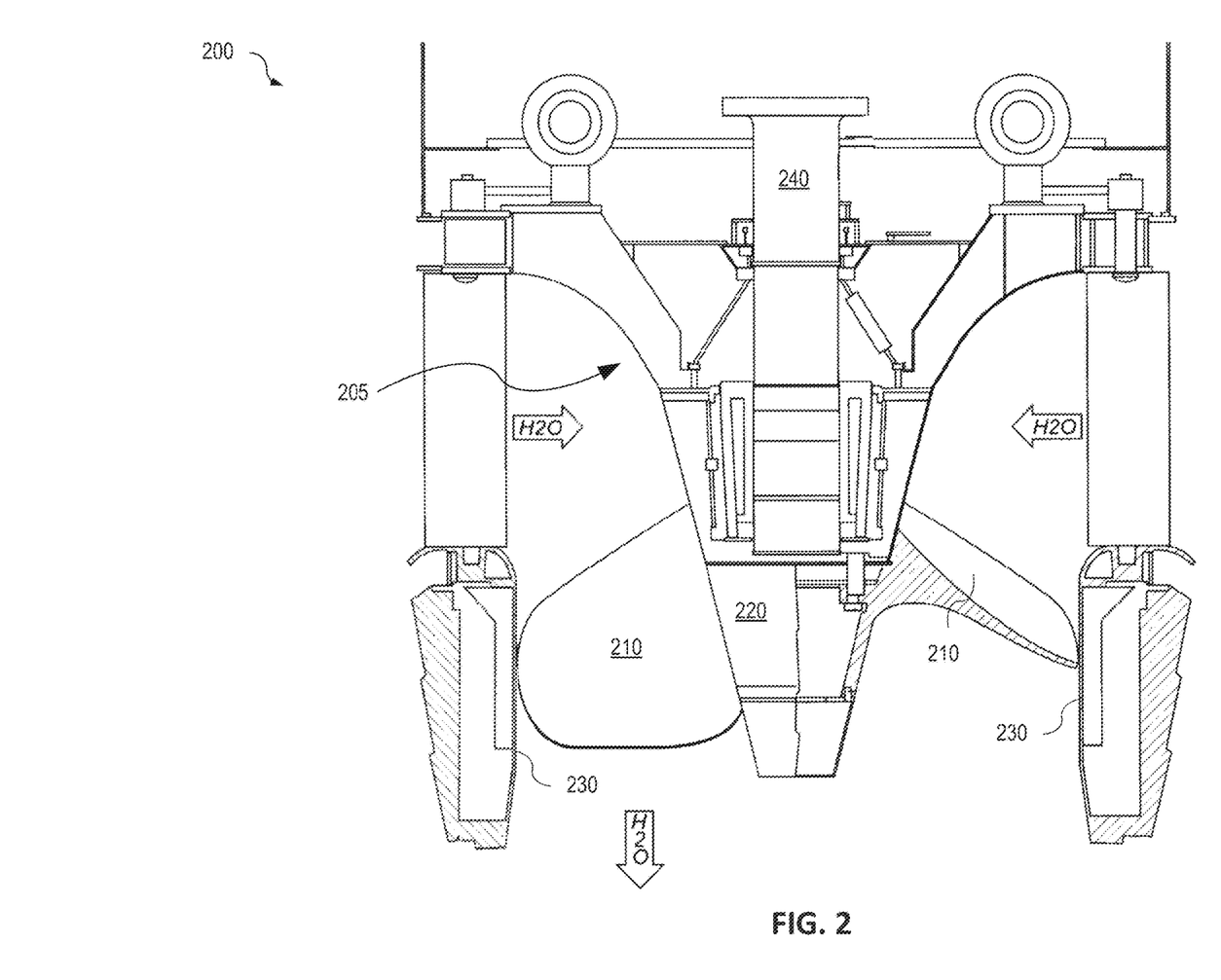
FIG. 2 illustrates another conventional hydraulic turbine.

FIG. 2 illustrates another conventional hydraulic turbine 200. The hydraulic turbine 200 may include a runner 205 having runner blades 210 coupled to a conical hub 220. Water entering the turbine flows radially with respect to the turbine shaft 240, its direction is changed as it flows through the hydraulic turbine 200, and it is discharged axially downward. A chamber formed by a discharge ring 230 extends cylindrically around the tips of runner blades 210. The turbine shaft 240 connects to the conical hub 220 and to an electrical generator (not shown) at an upper end of the turbine shaft 240.

Cavitation is a problem caused by static water pressure in the turbine that causes erosion and pitting of the metallic surfaces of the turbine components such as the discharge ring. In some cases, damage to the discharge ring can be repaired by resurfacing. Resurfacing the discharge ring can involve heavy lifting cranes for disassembly and removal of the turbine runner to gain access to the discharge ring, as well as additional heavy machinery to perform the resurfacing. Aspects of the present disclosure can provide systems and methods for resurfacing a hydraulic turbine discharge ring without removing the turbine runner.

The turbine runner itself may be utilized as part of the equipment employed to repair the discharge ring. According to some aspects of the present disclosure, adjustable fixtures configured to accommodate resurfacing equipment such as milling tools or other cutting equipment, welding equipment, etc., may be temporarily mounted on the blades of the turbine runner. Additional equipment may be used to cause the runner to rotate at a controlled speed, and resurfacing of the discharge ring may be performed by the resurfacing equipment mounted on the runner blades as the runner rotates.

Figure 3:
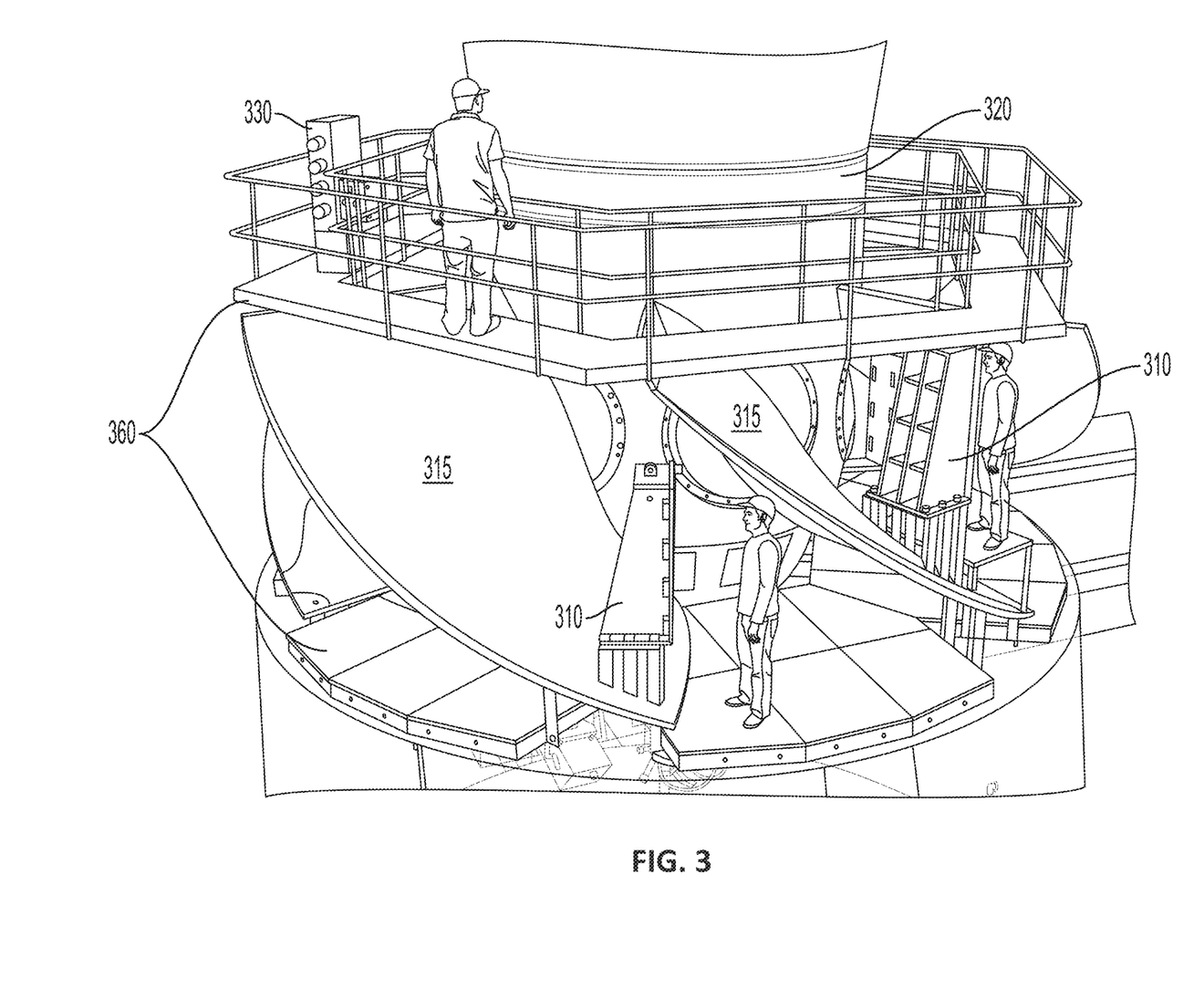
FIG. 3 is a simplified diagram illustrating an example of adjustable fixtures mounted to runner blades of a hydraulic turbine runner according to some aspects of the present disclosure.

FIG. 3 is a simplified diagram illustrating an example of adjustable fixtures mounted to runner blades of a hydraulic turbine runner according to some aspects of the present disclosure. As shown in FIG. 3, adjustable fixtures 310 may be temporarily attached to the runner blades 315 of a hydraulic turbine runner 320, for example, by welding or another method. The adjustable fixtures 310 may be mounted to several runner blades 315 spaced around the hydraulic turbine runner 320 such that the forces exerted on turbine shaft by operation of the resurfacing equipment act to maintain the hydraulic turbine runner 320 substantially centered in the discharge ring.

The adjustable fixtures 310 may be mounted at different vertical positions on each runner blade 315. The different vertical positions may enable resurfacing equipment attached to each adjustable fixture 310 to perform operations on a different vertical portion of the discharge ring. The adjustable fixtures 310 may permit positional adjustment of the mounted equipment in vertical, horizontal, and angular directions with respect to the work surface (e.g., the discharge ring). Temporary staging 360 may be installed on the hydraulic turbine runner 320 to perform the resurfacing operations for the discharge ring. The temporary staging 360 may provide a platform for workers and may rotate as the turbine runner 320 rotates.

Figure 4:
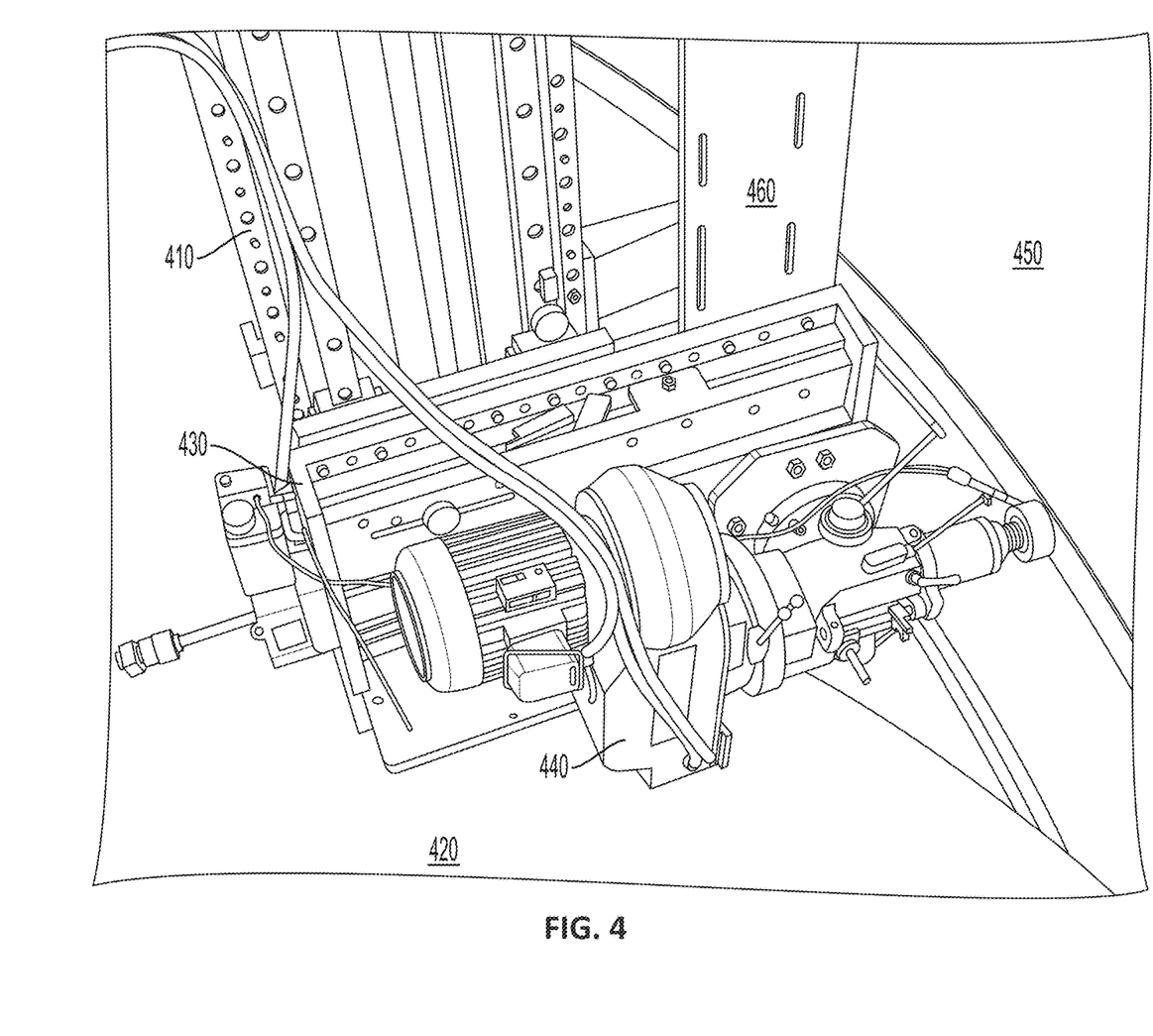
FIG. 4 is a diagram illustrating an example of a resurfacing tool installed on an adjustable fixture mounted to a runner blade according to some aspects of the present disclosure.

FIG. 4 is a diagram illustrating an example of a resurfacing tool installed on an adjustable fixture mounted to a runner blade according to some aspects of the present disclosure. Referring to FIG. 4, an adjustable fixture 410 may be mounted to a runner blade 420, for example by welding or another attaching means. A tool holder 430 may be attached to the adjustable fixture 410. The adjustable fixture 410 may enable the tool holder 430 to be repositioned in a vertical direction with respect to the discharge ring 450. The adjustable fixtures may be modified to accommodate resurfacing of discharge rings in different applications. For example, the mounting angle of the adjustable fixture may be modified according to the angle of inclination or an inclined turbine. A resurfacing tool 440 may be mounted on the tool holder 430. FIG. 4 illustrates a milling tool mounted on the tool holder 430. The tool holder 430 may be configured to enable adjustment of the tool mounted in the tool holder 430 towards or away from the discharge ring 450 as well as horizontal and vertical angular adjustments of the tool 440 with respect to the discharge ring 450. Other tools, for example, but not limited to, welding equipment, etc., may be mounted on the tool holder 430 without departing from the scope of the present disclosure.

Also illustrated in FIG. 4 is a profile template 460. The profile template 460 may be mounted to the adjustable fixture 410 and may provide a guide for resurfacing of the discharge ring 450 to a specified profile.

Figure 5:
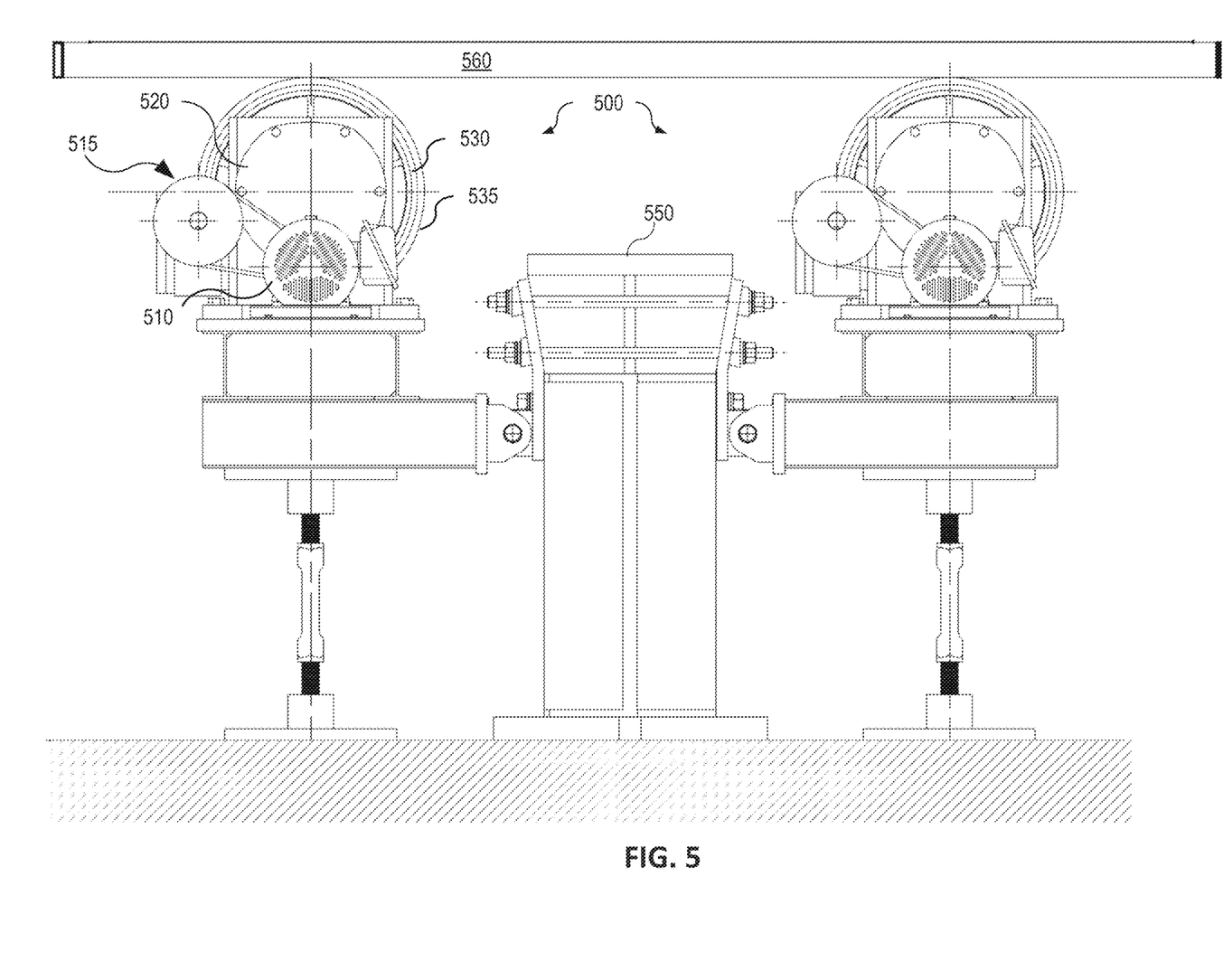
FIG. 5 is a simplified diagram of an example of a drive unit according to aspects of the present disclosure

One or more drive units may be temporarily installed on the hydraulic turbine to provide rotation of the turbine runner during the resurfacing operations. The one or more drive units may be attached to a portion of the frame of the hydraulic turbine at an upper portion of the hydraulic turbine and may provide rotational force to drive the turbine shaft. FIG. 5 is a simplified diagram of an example of a drive unit 500 according to aspects of the present disclosure. Referring to FIG. 5, the drive unit 500 may include an electric motor 510, a transmission 520, and a drive wheel 530.

The electric motor 510 may be an electric motor having sufficient horsepower to cause the turbine runner (e.g., the hydraulic turbine runner 320) to rotate. The transmission 520 may provide a gear reduction to enable the electric motor 510 to rotate the turbine runner. The electric motor 510 may transfer power to the transmission via a belt and pulley system 515 or a gearing system (not shown). The transmission 520 may rotate the drive wheel 530. The drive wheel 530 may include a friction surface 535 having a material with a high coefficient of friction, for example rubber or another material, configured to transfer power to the turbine shaft via frictional contact to cause the turbine runner to rotate.

Figure 8:
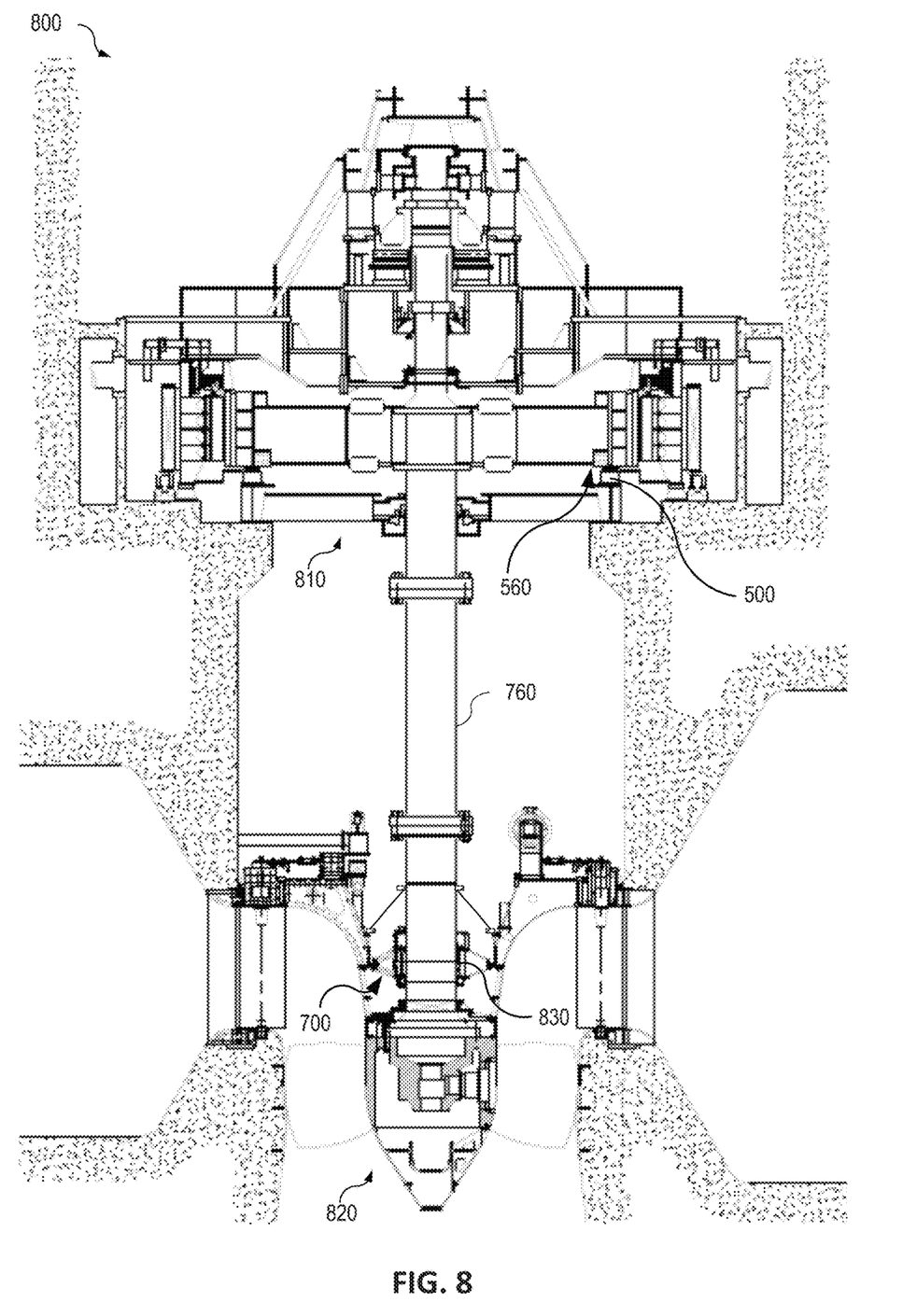
FIG. 8 is a diagram illustrating an example of a hydroelectric generator installation 800 according to some aspects of the present disclosure.

The one or more drive units 500 may be attached to a portion of the frame 550 located in the area of the electric generator driven by the turbine shaft (see FIG. 8). The electric generator may include a generator brake ring 560, or the generator brake ring 560 may be separate from the electric generator. The portion of the frame 550 to which the one or more drive units 500 are attached may be disposed in proximity to the generator brake ring 560. In typical hydraulic turbine operation, braking force applied to the generator brake ring 560 by a braking mechanism may cause the turbine shaft and turbine runner to slow down or stop. According to aspects of the present disclosure, during the resurfacing operations on the discharge ring, the frictional force of the rotating drive wheel 530 applied to the generator brake ring 560 by the friction surface 535 can cause the turbine runner to rotate. The rotational speed of the turbine runner may be controlled at a control panel.

Referring again to FIG. 3, a control panel 330 may control the electric motor 510 to start, stop, and control the rotational speed of the turbine runner. The control panel 330 may control the one or more drive units 500 to rotate the turbine runner at a speed to enable machining of the discharge ring surface at a rate of approximately two feet per second or another rate. The control panel 330 may also be configured to distribute power to the resurfacing equipment (e.g., milling tools or other cutting equipment, welding equipment, etc.) attached to the adjustable fixtures. The control panel 330 may be disposed on temporary staging 360 installed to perform the resurfacing operations for the discharge ring.

Figure 6:
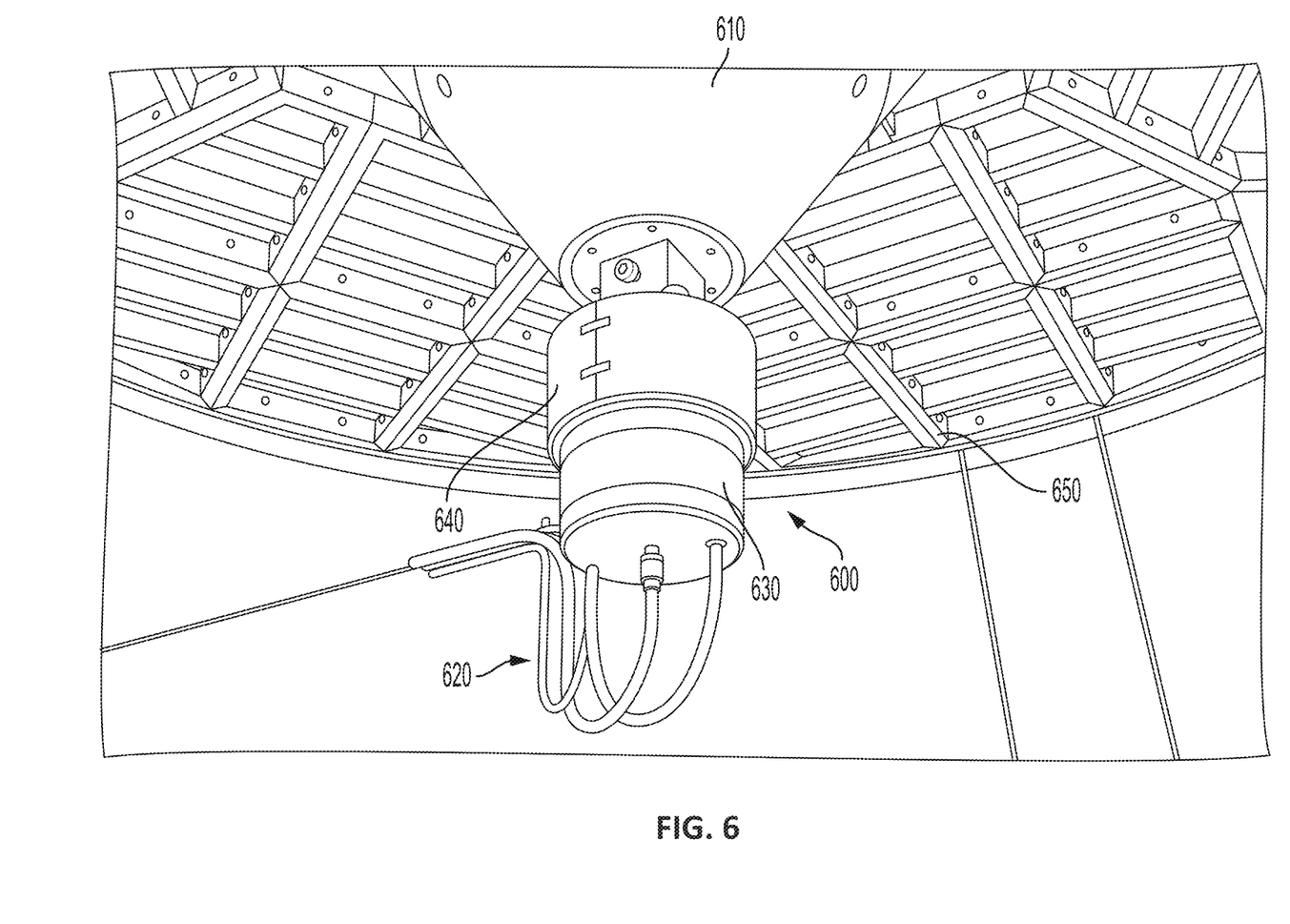
FIG. 6 is a diagram illustrating an example of a collector ring according to some aspects of the present disclosure.

Wired power, control, and feedback signals may be provided to and from the control panel 330 by a collector ring. FIG. 6 is a diagram illustrating an example of a collector ring 600 according to some aspects of the present disclosure. The collector ring 600 may be coupled to and disposed below the cone 610 of the turbine runner. The collector ring 600 may provide a slip ring arrangement to provide the power and control signals to the rotating turbine runner (e.g., the hydraulic turbine runner 320). The collector ring 600 may enable communication and power distribution from stationary sources (e.g., electric generators) and equipment (e.g., the drive unit 500) to equipment such as the control panel 330 and resurfacing equipment (e.g., the milling tool 440) disposed on the runner while the runner is rotating. Wiring 620 from the stationary equipment may be coupled to a stationary portion 630 of the collector ring 600 while a rotating portion 640 of the collector ring 600 coupled to the cone 610 rotates with the turbine runner. Temporary staging 650 attached to the turbine runner may also rotate with the turbine runner.

To maintain the dimensional tolerances required for resurfacing the discharge ring, control of turbine shaft runout greater than that provided by the turbine shaft bearing is needed. Runout is a condition where the centerline of the turbine shaft deviates from a true axis of rotation. According to aspects of the present disclosure, steady rest bearings may be installed at multiple positions around the turbine shaft to maintain a position of a central axis of rotation of the turbine shaft within a specified dimensional tolerance with respect to a center of the discharge ring.

Figure 7:
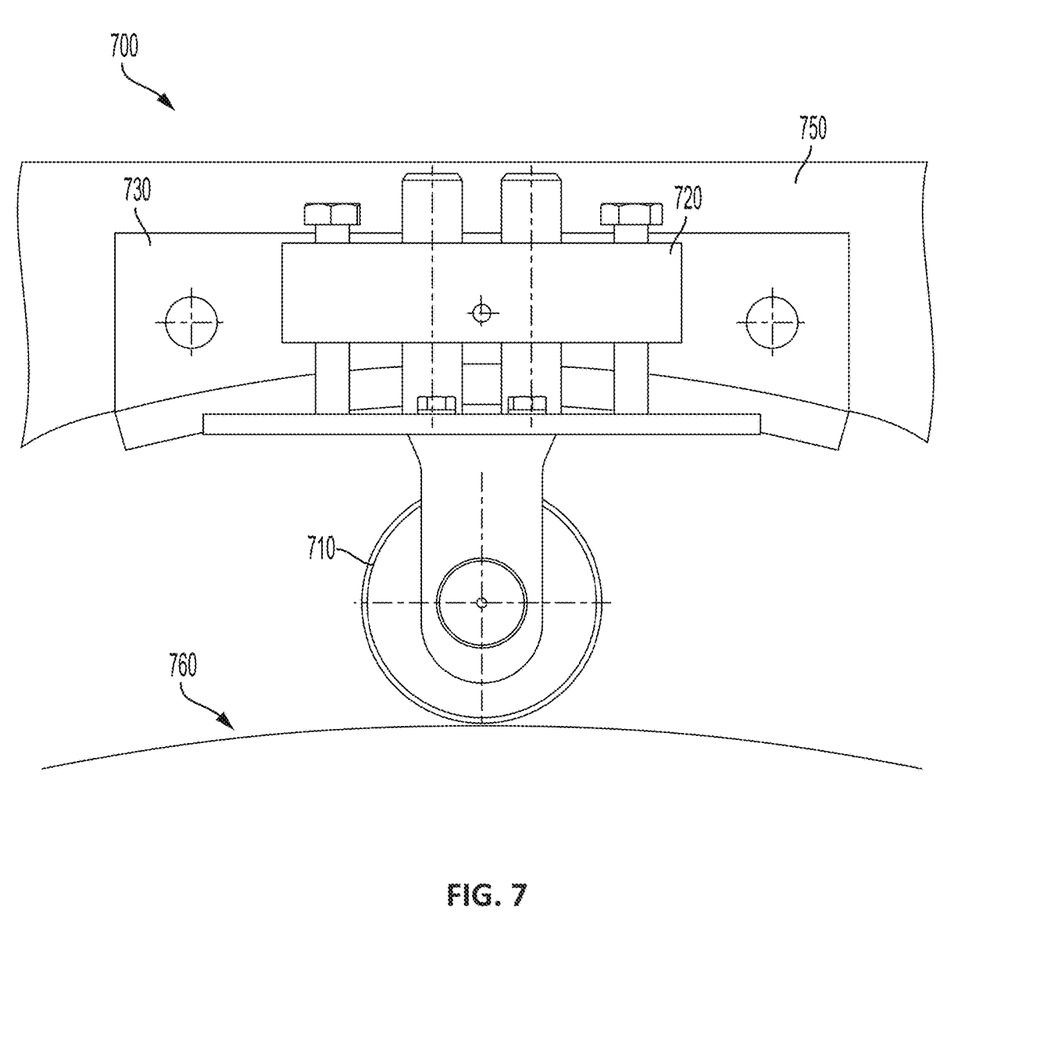
FIG. 7 is a simplified diagram of a steady rest bearing assembly according to some aspects of the present disclosure.

FIG. 7 is a simplified diagram of a steady rest bearing assembly 700 according to some aspects of the present disclosure. The steady rest bearing assembly 700 may include a bearing 710, an adjustable bracket 720, and a mounting bracket 730. The bearing may be, for example, but not limited to, a roller bearing, a ball bearing, a shaft and bushing, etc. After removal of the turbine shaft bearing (see FIG. 8, element 830), steady rest bearing assemblies 700 may be installed on the frame 750 of the hydraulic turbine via the mounting brackets 730 at several positions around the turbine shaft in place of the turbine shaft bearing. The bearings 710 may then be adjusted via the adjustable brackets 720 to positions that restrain the turbine shaft 760 to be within the specified dimensional tolerance with respect to the center of the discharge ring.

FIG. 8 is a diagram illustrating an example of a hydroelectric generator installation 800 according to some aspects of the present disclosure. As shown in FIG. 8, an electric generator 810 may be located in an upper portion of the hydroelectric generator installation 800 and may be connected to a turbine runner 820 by a turbine shaft (e.g., the turbine shaft 760). The drive unit 500, including the electric motor 510, the transmission 520, and the drive wheel 530, for rotating the turbine runner 820 may be mounted at the upper portion of the hydroelectric generator installation 800 beneath the electric generator 810 with the drive wheel 530 in contact with the generator brake ring 560. The steady rest bearing assemblies 700 may be installed above the turbine runner 820 after removal of the turbine shaft bearing 830 to restrain the turbine shaft 760 to be within the specified dimensional tolerance with respect to the center of the discharge ring.

Figure 9A:
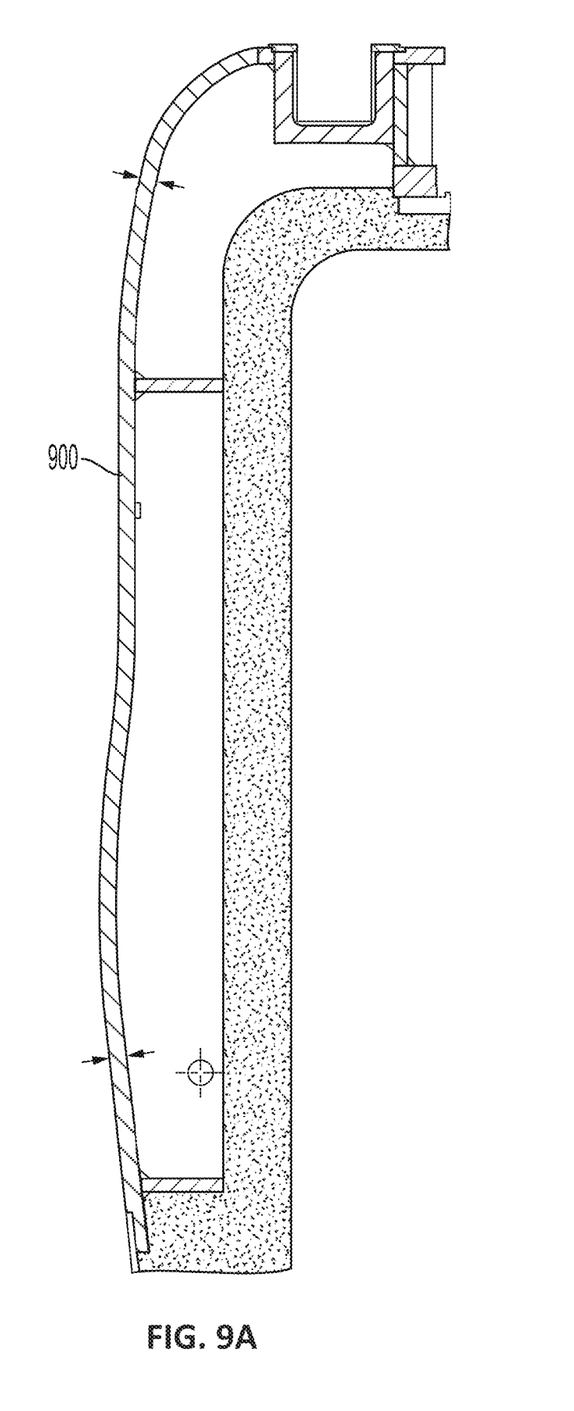
FIG. 9A is a diagram illustrating an example of a profile of a discharge ring according to some aspects of the present disclosure.

The discharge ring may have specified dimensional tolerances for its profile to provide proper water flow through the hydraulic turbine. FIG. 9A is a diagram illustrating an example of a profile of a discharge ring 900 according to some aspects of the present disclosure. As illustrated in FIG. 9A, the diameter of the discharge ring 900 may vary along its length. In addition, smoothness of the surface of the discharge ring 900 may specified. A profile template may be used to ensure adherence to specified dimensional tolerances during the resurfacing operations. An overall profile template for the entire vertical surface of the discharge ring may be fabricated according to a specified surface profile.

Figure 9B:
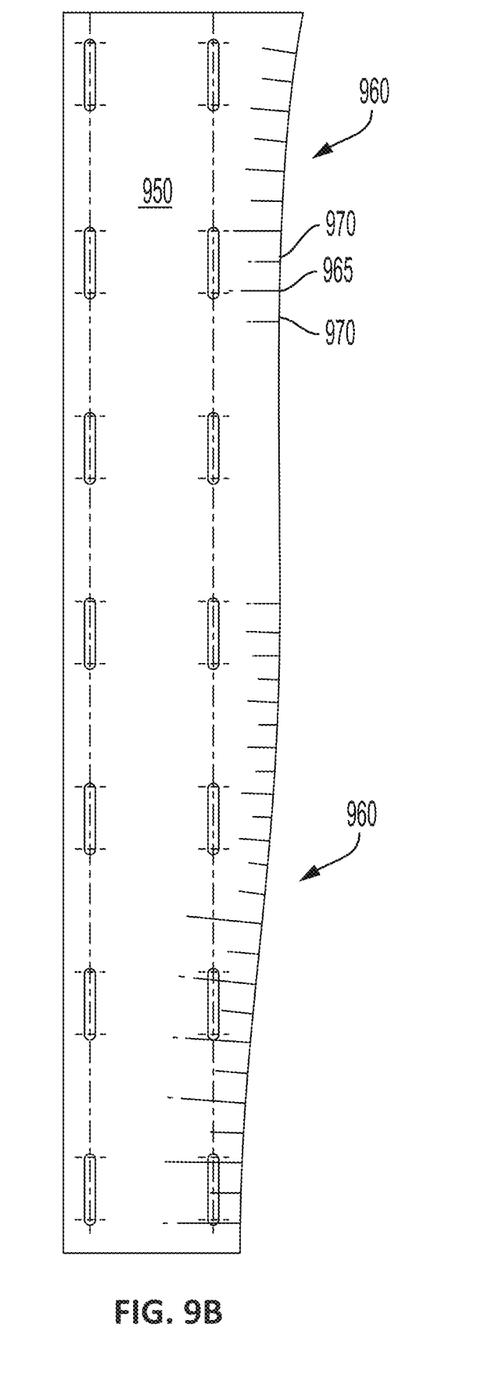
FIG. 9B is a diagram illustrating an example of a profile template according to some aspects of the present disclosure.

FIG. 9B is a diagram illustrating an example of a profile template 950 according to some aspects of the present disclosure. The profile template 950 may be, for example, the profile template 460 shown in FIG. 4. The profile template 950 may be fabricated from a rigid material, for example, aluminum or another material. The profile template 950 may include alignment marks 960 indicating a centerline position of a tool for each resurfacing operation as well as a tool centerline angle for the operation. For example, the alignment marks 960 on the profile template may indicate a centerline position 965 at which to center a cutting bit of a milling tool or other cutting equipment as well as the centerline angle at which the cutting bit should be set to contact the discharge ring 900. The template marks may be transferred to the discharge ring to align the cutting bit. Marks 970 on the profile template 950 may also indicate a width of each cut. For example, each cut into the discharge ring 900 may be approximately three to four inches or another width. The profile template 950 may indicate the extents of the cut on both sides of the centerline for the cuts. In general, the profile of the discharge ring 900 is a curved surface but each cut is a straight line. The adjustable fixture and tool holder enable the position of the tool to be changed according to the profile template 950 such that the series of straight line cuts approximates the curved surface of the discharge ring 900 within the specified tolerances.

A profile template for the entire vertical length of the discharge ring, which may be approximately six feet or another vertical length, may be established. The profile template may be divided into sections to enable multiple sections of the discharge ring to be resurfaced concurrently. For example, resurfacing equipment (e.g., milling tools or other cutting equipment) may be attached to the adjustable fixtures mounted to different runner blades at different vertical positions with respect to the discharge ring. A section of the profile template corresponding to the vertical height of the discharge ring may be attached to each adjustable fixture and aligned to the discharge ring. The profile template sections can provide a guide for concurrently performing the resurfacing operations at each of the separate adjustable fixture positions.

As an example, a first adjustable fixture may be mounted on a first runner blade at a lowest vertical height of the discharge ring. The first adjustable fixture may enable a first resurfacing tool attached to the first adjustable fixture to perform resurfacing operations on a lowest section of the discharge ring according to a first section of the profile template. A second adjustable fixture may be mounted on a second runner blade at an intermediate vertical height of the discharge ring above the lowest section of the discharge ring. The second adjustable fixture may enable a second resurfacing tool attached to the second adjustable fixture to concurrently perform resurfacing operations on an intermediate section of the discharge ring according to a second section of the profile template. Finally, a third adjustable fixture may be mounted on a third runner blade at a highest vertical height above the intermediate section of the discharge ring. The third adjustable fixture may enable a third resurfacing tool attached to the third adjustable fixture to concurrently perform resurfacing operations on a highest section of the discharge ring according to a third section of the profile template.

For a discharge ring having a vertical height of approximately six feet, each tool may perform resurfacing operations on a vertical section of approximately two feet of the discharge ring. While this example describes three fixtures for concurrently machining three vertical sections of a discharge ring, other configurations may be used without departing from the scope of the present disclosure.

Each resurfacing operation that removes material from the discharge ring (e.g., cutting operations) may be accomplished during one or more rotations of the hydraulic turbine runner. More than one rotation of the hydraulic turbine runner may be required to remove the required amount of material during a given operation. When each of the resurfacing tools have completed the given operation, rotation of the hydraulic turbine runner may be halted and each of the resurfacing tools repositioned on their respective adjustable fixtures and adjustable tool holders to perform the next resurfacing operation at a next vertical position on the discharge ring. After the resurfacing tools are repositioned hydraulic turbine runner rotation may be commenced for the next resurfacing operation.

Similarly, each resurfacing operation that adds material to the discharge ring (e.g., welding operations) may be accomplished during one or more rotations of the hydraulic turbine runner. More than one rotation of the hydraulic turbine runner may be required to add the required amount of material during a given operation. When each of the resurfacing tools have completed the given operation, rotation of the hydraulic turbine runner may be halted and each of the resurfacing tools repositioned on their respective adjustable fixtures and adjustable tool holders to perform the next resurfacing operation at a next vertical position on the discharge ring. After the resurfacing tools are repositioned hydraulic turbine runner rotation may be commenced for the next resurfacing operation.

Referring back to FIG. 4, the profile template may be mounted to the adjustable fixture 410 to enable proper alignment of the profile template. The initial alignment of the profile template to the discharge ring may be performed using laser measurement equipment or by another method. The profile template may be positioned close to the surface of the discharge ring, for example, within two to three inches or another distance, and a depth of each cut into the discharge ring to a machined surface produced by the cutting equipment may be determined based on measurements performed between an edge of the profile template and the machined surface of the discharge ring. Thus, accurate placement of the profile template can enable accurate machining of the discharge ring profile.

Figure 10:
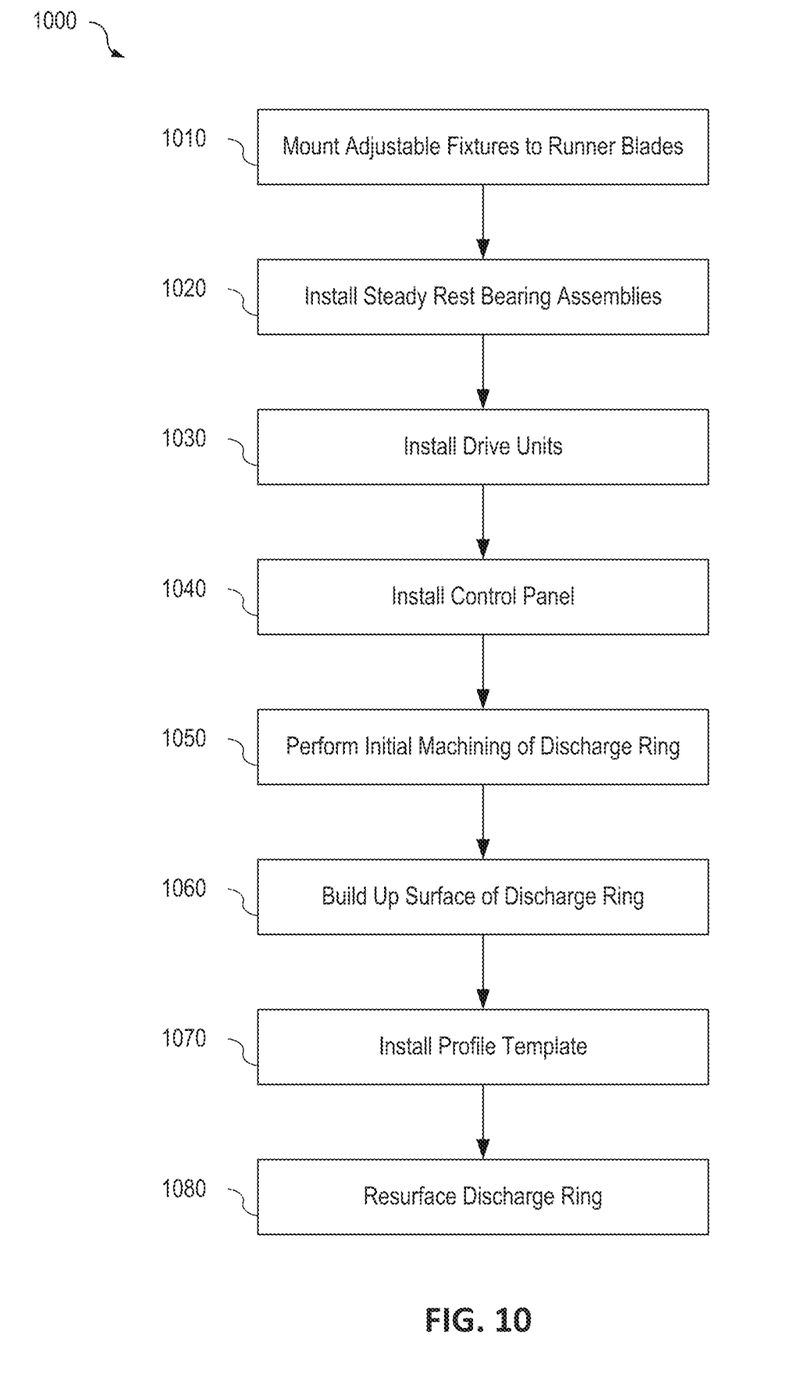
FIG. 10 is a flowchart illustrating an example of a method for resurfacing a discharge ring with a turbine runner in place according to some aspects of the present disclosure.

FIG. 10 is a flowchart illustrating an example of a method 1000 for resurfacing a discharge ring with a turbine runner in place according to some aspects of the present disclosure. Referring to FIG. 10, at block 1010, adjustable fixtures may be mounted to runner blades of a hydraulic turbine runner. The adjustable fixtures may be temporarily attached to the runner blades by welding or another method. The adjustable fixtures may be mounted to several runner blades approximately equally spaced around the hydraulic turbine runner. For example, an adjustable fixture may be mounted to each of three approximately equally spaced runner blades with each adjustable fixture mounted at a different vertical height with respect to the discharge ring. The adjustable fixtures may include adjustable tool holders, and resurfacing tools may be attached to the tool holders. The positions of each resurfacing tool may be adjusted on the adjustable fixtures such that each tool can resurface a different vertical section of the discharge ring.

At block 1020, steady rest bearing assemblies may be installed. The turbine shaft bearing may be removed and steady rest bearing assemblies may be installed on the frame of the hydraulic turbine via mounting brackets of the steady rest bearing assemblies. The steady rest bearing assemblies may be disposed at several positions around the turbine shaft in place of the turbine shaft bearing. Bearings of steady rest bearing assemblies may then be adjusted via adjustable brackets to positions that restrain the turbine shaft such that the axis of rotation of the turbine shaft may be maintained within a specified dimensional tolerance with respect to the center of the discharge ring.

At block 1030, drive units may be installed. One or more drive units may be installed to provide rotation of the hydraulic turbine runner during the resurfacing operations. The one or more drive units may be attached to a portion of the frame of the hydraulic turbine in an area of the electrical generator driven by the turbine shaft. The one or more drive units may engage a generator brake ring to provide rotational force to drive the turbine shaft.

At block 1040, a control panel may be installed. The control panel be installed on temporary staging installed to perform the resurfacing operations for the discharge ring. The control panel may control the one or more drive units to rotate the turbine runner at a speed to enable resurfacing of the discharge ring surface. The control panel may also be configured to distribute power to the resurfacing equipment attached to the adjustable fixtures. Wired power, control, and feedback signals may be provided to and from the control panel by a collector ring configured to enable the connections from stationary sources to the rotating turbine runner.

At block 1050, initial machining may be performed on the discharge ring. Cutting tools, for example, milling tools or other cutting equipment, may be attached to tool holders of the adjustable fixtures. Operator inputs to the control panel may cause the one or more drive units to rotate the turbine runner at a specified rate while the cutting tools remove material from the surface of the discharge ring to remove scale and cavitation damage. Each cutting tool may concurrently remove material from a different vertical section of the surface of the discharge ring.

At block 1060, the surface of the discharge ring may be built up. Welding tools may be attached to the tool holders on the adjustable fixtures. Additional material, for example, stainless steel or another material, may be added to the surface of the discharge ring by performing welding operations to build up the welded material to a predetermined thickness. The welding may be performed as the runner is rotated at a specified speed by the one or more drive units. Automatic welding machines that continuously apply weld material to the discharge ring as the runner is rotated. Several automatic welding machines may be mounted on the adjustable fixtures (e.g., the adjustable fixtures 310) that are spaced out both vertically and on different runner blades. Spacing out the automatic welding machines enables welding in different areas to spread out the amount of heat applied to the discharge ring thereby reducing thermal stresses on the discharge ring.

At block 1070, a discharge ring profile template may be installed. The profile template may be used to ensure adherence to specified dimensional tolerances during the resurfacing operations. The profile template may include alignment marks indicating centerline positions for alignment of a tool for each resurfacing operation as well as a tool centerline angle for the operation. A profile template for the entire vertical length of the discharge ring may be established. The profile template may be divided into sections to enable multiple sections of the discharge ring to be resurfaced concurrently. A section of the profile template corresponding to the vertical height of the discharge ring may be attached to each adjustable fixture, spaced a short distance (e.g., approximately two inches) from the surface of the discharge ring, and aligned to the discharge ring. The profile template sections can provide a guide for concurrently performing the resurfacing operations at each of the adjustable fixture positions.

At block 1080, the discharge ring may be resurfaced. The alignment marks from the profile template may be transferred to the discharge ring to align the cutting bit of the resurfacing tool, and the welded material may be removed from the surface of the discharge ring as the turbine runner is rotated by the one or more drive units. The adjustable fixture and tool holder enable the position of the tool to be changed according to the profile template such that the series of straight line cuts approximate the curved surface of the discharge ring within the specified tolerances. The depth of the cut may be determined by measurements performed between the edge of the profile template and the machined surface of the discharge ring produced by the cutting equipment. The vertical sections of the discharge ring corresponding to each adjustable fixture position may be concurrently resurfaced as the turbine runner is rotated.

The specific operations illustrated in FIG. 10 provide a particular method for resurfacing a discharge ring with a turbine runner in place according to an embodiment of the present disclosure. Other sequences of operations may also be performed according to alternative embodiments. For example, alternative embodiments of the present disclosure may perform the operations outlined above in a different order. Moreover, the individual operations illustrated in FIG. 10 may include multiple sub-operations that may be performed in various sequences as appropriate to the individual operation. Furthermore, additional operations may be added or removed depending on the particular applications.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method for repairing a discharge ring of a hydraulic turbine with a turbine runner in place, the method comprising:

mounting adjustable fixtures to runner blades that are substantially evenly spaced around the turbine runner, wherein each adjustable fixture is mounted to a different runner blade at a different predetermined vertical position with respect to a surface of the discharge ring;

installing a discharge ring profile template to each adjustable fixture at a predetermined position with respect to the surface of the discharge ring, wherein the discharge ring profile template indicates centerlines and centerline angles for removing material from the discharge ring;

attaching cutting equipment configured to remove material from the discharge ring to each adjustable fixture installed on the runner blades;

installing a drive unit configured to rotate the turbine runner;

controlling the drive unit to rotate the runner at a specified speed; and controlling the cutting equipment attached to each adjustable fixture to concurrently remove material from the discharge ring as the turbine runner rotates.

2. The method of claim 1, further comprising:

for each material removal operation, setting a centerline and a centerline angle of a cutting bit of the cutting equipment to remove the material from the discharge ring, wherein the discharge ring profile template indicates the centerline and centerline angle for removing the material from the discharge ring.

3. The method of claim 1, further comprising:

determining an amount of removed material by measuring between an edge of the discharge ring profile template and a machined surface of the discharge ring produced by the cutting equipment.

4. The method of claim 1, wherein the discharge ring profile template attached to each adjustable fixture is a portion of an overall profile template for the vertical surface of the discharge ring, and wherein each portion of the overall profile template is a profile of the portion of the vertical surface of the discharge ring corresponding to the vertical position of one of the adjustable fixtures.

5. The method of claim 1, further comprising:

installing bearing assemblies at multiple positions around a circumference of a turbine shaft connected to the turbine runner to maintain a position of a central axis of the turbine shaft within a specified dimensional tolerance as the turbine shaft is rotated.

6. The method of claim 1, further comprising:

performing an initial material removal operation to remove damaged portions of the surface of the discharge ring.

7. The method of claim 6, further comprising:

after performing the initial material removal operation, performing a welding operation to add material to the surface of the discharge ring.

8. The method of claim 1, wherein the drive unit is configured to rotate the turbine runner by applying a rotational force to a brake ring of the hydraulic turbine.

9. A method for resurfacing a discharge ring of a hydraulic turbine, the method comprising:

mounting adjustable fixtures to runner blades of a runner of the hydraulic turbine while the runner is in place on the hydraulic turbine, the adjustable fixtures being configured to accommodate adjustable tool holders, the adjustable tool holders being configured to attach tools for performing resurfacing operations on the discharge ring of the hydraulic turbine, wherein each adjustable fixture is mounted to a different runner blade at a different predetermined vertical position with respect to a surface of the discharge ring;

installing a discharge ring profile template to each adjustable fixture at a predetermined position with respect to the surface of the discharge ring, wherein the discharge ring profile template indicates centerlines and centerline angles for positioning the tools to perform operations to achieve a specified profile;

installing to a portion of a turbine frame one or more drive units configured to cause the runner of the hydraulic turbine to rotate, the one or more drive units being configured to provide a rotational force to a brake ring attached to a turbine shaft of the hydraulic turbine; and controlling cutting equipment attached to each adjustable fixture to concurrently remove material from the discharge ring as the turbine runner rotates at a specified speed.

10. The method of claim 9, wherein the runner blades on which the adjustable fixtures are mounted are substantially evenly spaced around the turbine runner.

11. The method of claim 9, further comprising:

maintaining a position of a central axis of the turbine shaft within a specified dimensional tolerance as the turbine shaft is rotated by installing bearing assemblies at multiple positions around a circumference of the turbine shaft.

12. The method of claim 9, further comprising:

dividing the discharge ring profile template into sections corresponding to vertical sections of the discharge ring, and attaching each section of the discharge ring profile template to one of the adjustable fixtures disposed at a corresponding vertical section of the discharge ring.

* * * * *

UNITED STATES PATENT AND TRADEMARK OFFICE
CERTIFICATE OF CORRECTION

PATENT NO. : 11,433,491 B1
APPLICATION NO. : 17/375409
DATED : September 6, 2022
INVENTOR(S) : Samuel Riley Kent et al.

It is certified that error appears in the above-identified patent and that said Letters Patent is hereby corrected as shown below:

On the Title Page

Please delete (72) Inventors:
"Samuel Riley Kent, Davidson, NC (US); Mauricio Recalcatti, Charlotte, NC (US); Nathan Steele, Concord, NC (US); Joseph Matthew Travis, Huntersville, NC (US); Bernard Cantin, Charlotte, NC (US); William Hopper, Lewiston, ID (US); Kenneth R. Sykes, Newport, WA (US); Lorenzo Pelayo, Payette, ID (US); Christopher Hayes, Lenore, ID (US); Hiram Lee Avant, Wilmington, NC (US)"

And insert:
--Samuel Riley Kent, Davidson, NC (US); Mauricio Recalcatti, Charlotte, NC (US); Nathan Steele, Concord, NC (US); Joseph Matthew Travis, Huntersville, NC (US); Bernard Cantin, Charlotte, NC (US); William Hopper, Lewiston, ID (US); Kenneth R. Sykes, Newport, WA (US); Lorenzo Pelayo, Payette, ID (US); Christopher Hayes, Lenore, ID (US); Hiram Lee Avant, Wilmington, NC (US); Christopher Tuttle, Fort Smith, AR (US)--

Signed and Sealed this
First Day of April, 2025

Coke Morgan Stewart
*Acting Director of the United States Patent and Trademark Office*